US008132231B2

(12) United States Patent
Amies et al.

(10) Patent No.: US 8,132,231 B2
(45) Date of Patent: Mar. 6, 2012

(54) MANAGING USER ACCESS ENTITLEMENTS TO INFORMATION TECHNOLOGY RESOURCES

(75) Inventors: Alexander Phillip Amies, Irvine, CA (US); Sadanand Rajaram Bajekal, Austin, TX (US); Christopher Michael Bauserman, Austin, TX (US); Leanne L. Chen, Laguna Niguel, CA (US); Sridhar R. Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 11/951,980

(22) Filed: Dec. 6, 2007

(65) Prior Publication Data

US 2009/0150981 A1    Jun. 11, 2009

(51) Int. Cl.
 *G06F 7/04* (2006.01)
(52) U.S. Cl. ............. 726/2; 726/1; 726/3; 726/4; 726/5; 726/6
(58) Field of Classification Search .................. 726/2–6, 726/1
See application file for complete search history.

(56) References Cited

U.S. PATENT DOCUMENTS

| | | | |
|---|---|---|---|
| 6,446,071 | B1 | 9/2002 | Callaway et al. |
| 7,194,472 | B2 * | 3/2007 | Excoffier et al. ...................... 1/1 |
| 7,536,184 | B2 * | 5/2009 | Poczo ........................ 455/432.3 |
| 7,707,623 | B2 * | 4/2010 | Cicchitto et al. ................... 726/4 |
| 2005/0010547 | A1 * | 1/2005 | Carinci et al. ..................... 707/1 |
| 2005/0102535 | A1 * | 5/2005 | Patrick et al. ................. 713/201 |
| 2005/0204048 | A1 | 9/2005 | Pujol et al. |
| 2006/0059546 | A1 | 3/2006 | Nester et al. |
| 2007/0073699 | A1 * | 3/2007 | Reed ................................. 707/9 |
| 2007/0208602 | A1 * | 9/2007 | Nocera et al. ...................... 705/8 |
| 2007/0209066 | A1 * | 9/2007 | Timmerman ..................... 726/6 |
| 2007/0233531 | A1 * | 10/2007 | McMahon ......................... 705/7 |
| 2007/0283443 | A1 * | 12/2007 | McPherson et al. ............ 726/26 |
| 2009/0144802 | A1 * | 6/2009 | Tillery et al. ..................... 726/1 |

OTHER PUBLICATIONS

Karjoth, Access Control with IBM Tivoli Access, ACM Transactions on Information and System Security, V6, No. 2, p. 232-257, 2003.*
Gebel, "Roles and Access Management: Seeking a Balance Between Roles and Rules", http://www.norskdigitalbibliotek.no/archives/RolesAndAccessMgr.pdf, v1, Jun. 13, 2003, pp. 1-43.
Skogsrud et al., "Model-Driven Trust Negotiation for Web Services", IEEE Computer Society, Nov.-Dec. 2003, pp. 45-52.
Shewmaker et al., "SOA Management Landscape: Achieving Enterprise Service Management within the Modern IT Architecture", http://www.mw2consulting.com, Mar. 2006, pp. 1-31.
Bhatti, "X-Federate: A Policy Engineering Framework for Federated Access Management", PhD Defense Talk, Purdue University, Apr. 3, 2006, pp. 1-80. Naqvi, "Thèse: présentée pour obtenir le grade de Docteur de l'École Nationale Supérieure des Télécommunications. Spécialité: Informatique et Réseaux", Dec. 1, 2005, pp. 1-154.

* cited by examiner

*Primary Examiner* — Nabil El Hady
(74) *Attorney, Agent, or Firm* — Yee & Associates, P.C.; Jeffrey S. LaBaw

(57) ABSTRACT

A computer implemented method, data processing system, and computer program product for logical management and provisioning of business applications within the framework of an identity management system. The illustrative embodiments providing an interface layer to map respective attributes, permissions, and resource accounts in a data repository needed to represent access to business applications via a managed service in the identity management system. The illustrative embodiments define user entitlements on a user account associated with the managed service. The illustrative embodiments provision user access to the business applications via the managed service in the identity management system upon user request.

18 Claims, 12 Drawing Sheets

RESOURCE.DEF
<!-- -->
<!-- Source File Name = resource.def -->
<!-- -->
<!-- (C) COPYRIGHT IBM Corp. 2003 All Rights Reserved -->
<!-- -->
<!-- US Government Users Restricted Rights - Use, duplication or -->
<!-- disclosure restricted by GSA ADP Schedule Contract with IBM Corp. -->
<!-- ****************************************************************** -->

<!-- This document describes the resource definition for an example service. -->
<Resource>
  <!-- The system profile contains an overall description and any specific -->
  <!-- properties to be used for communications. -->
  <SystemProfile>
    508 — <Name>erLDAPService</Name>
    510 — <Description>LDAP-DSML2 service.</Description>
    512 — <BehaviorProperties>
      <!-- The service provider factory should have the value used to -->
      <!-- instantiate the DSMLv2 protocol module. -->
      <Property Name = "com.ibm.itim.remoteservices.ResourceProperties.SERVICE_PROVIDER_FACTORY"
                Value = "com.ibm.itim.remoteservices.provider.dsml2.DSML2ServiceProviderFactory"/>
    </BehaviorProperties>
  </SystemProfile>

<!-- Protocol propeties add values from the service instance to request messages to the -->
  <!-- end point. -->
  <ProtocolProperties>
    <Property Name = "url" LDAPName = "erurl"/> — 514
    <Property Name = "principal"

FROM FIG. 5A

504:
- 514 — LDAPName= "erUid" /〉
  - 〈Property Name = "credentials"
- 514 — LDAPName= "erPassword" /〉
- 〈/ProtocolProperties〉

〈!-- Defines a profile for the custom account type. --〉
〈AccountDefinition ClassName = "erLDAPaccount"
　　　　Description = "LDAP extra Attribute user account."〉
〈/AccountDefinition〉

506:
〈!-- Defines a profile for the custom service type. --〉
〈ServiceDefinition ServiceProfileName = "LDAPprofile" 〜 516
　　518 — SeviceClass = "erLDAPService"
　　520 — AttributeName = "erServiceName"
　　522 — AccountClass = "erLDAPaccount"
　　524 — AccountProfileName = "LDAP Account"
　　526 — Description = "LDAP DSML2 Service."〉
〈/ServiceDefinition〉

〈/Resource〉

```
<!--                                          -->
<!-- Source File Name = resource.def           -->
<!--                                          -->
<!-- (C) COPYRIGHT IBM Corp. 2003 All Rights Reserved           -->
<!--                                          -->
<!-- US Government Users Restricted Rights - Use, duplication or  -->
<!-- disclosure restricted by GSA ADP Schedule Contract with IBM Corp.  -->
<!-- ************************************************************* -->

<!-- This document describes the resource definition for an example service.  -->

<Resource>
<!-- The system profile contains an overall description and any specific  -->
<!-- properties to be used for communications. -->
    <SystemProfile>
608 ~  <Name>erSalesForecastService</Name>
610 ~  <Description>Sales Forecasting Service. </Description>
612 ~  <BehaviorProperties>
            <!-- The service provider factory should have the value used to  -->
            <!-- instantiate the DSMLv2 protocol module. -->
            <Property Name = "com.ibm.itim.remoteservices.ResourceProperties.SERVICE_PROVIDER_FACTORY"
                Value = "com.ibm.itim.remoteservices.provider.dsml2.DSML2ServiceProviderFactory"/>
        </BehaviorProperties>
    </SystemProfile>

<!-- Protocol propeties add values from the service instance to request messages to the  -->
<!-- end point. -->
    <ProtocolProperties>
        <Property Name = "url" LDAPName = "erurl"/> ~614
        <Property Name = "principal"
```

FROM FIG. 6A

```
614 ─── LDAPName= "erUid" />
    <Property Name = "credentials"
614 ─── LDAPName= "erPassword" />
</ProtocolProperties>
```
(604)

```
<!-- Defines a profile for the custom account type. -->
<AccountDefinition ClassName = "erSalesForecastAccount"
    Description = "Sales Forecasting Account.">
</AccountDefinition>

<!-- Defines a profile for the custom service type. -->
<ServiceDefinition ServiceProfileName = "SalesForecastProfile" ─── 616
    618 ─── SeviceClass = "erSalesForecastService"
    620 ─── AttributeName = "erServiceName"
    622 ─── AccountClass = "erSalesForecastAccount"
    624 ─── AccountProfileName = "Sales Forecasting Account"
    626 ─── Description = "Sales Forecasting DSML2 Service.">
</ServiceDefinition>
```
(606)

```
</Resource>
```

Tivoli Identity Manager  IBM.

Welcome, Judith Hall   Help  Logoff

Home > Search for access

Search for Access

Search for applications, shared folders, etc.

Search in:
[All ▼]

Search for:
[          ]  [Search]

Search Results
Click the name of the access you would like to request.

| Access Name | Access Type | Description |
|---|---|---|
| Access to GSA | Shared Folder | Access to shared folders on GSA server (no direct request) |
| ACME Appraisal App | Application | ACME employee appraisal system |
| Acme Financial Owner | Email Group | Acme Financial Owner |
| Global Storage Server | Shared Folder | Access to global storage server |
| Project Athena Financials | Role | Project Athena Financials |

Page 1 of 1   Total: 5   Displayed: 5

Go to Home Page

902

MANAGING USER ACCESS ENTITLEMENTS TO INFORMATION TECHNOLOGY RESOURCES

BACKGROUND OF THE INVENTION

1. Field of the Invention

The present invention relates generally to an improved data processing system and in particular to access entitlement. Specifically, the present invention provides a mechanism for logical management and provisioning of user access to business applications within the framework of an identity management system.

2. Description of the Related Art

An Identity Manager (IdM) is a management system which is used to provide centralized management of user identity and user accounts. One example of an identity management system is Tivoli Identity Manager (TIM), which is a product of International Business Machines Corporation. A user identity is a set of attributes which are used to uniquely identify the user. A user may perform certain actions or access certain information technology (IT) resources in a network based on the user's entitlements. Access entitlement is defined as the capability-based reasons that a user should be given a permission or set of permissions to access resources in an IT environment.

Access entitlement may also be applied to software applications. Applications written to run within a Java 2 Platform, Enterprise Edition (J2EE) environment are secured through two primary mechanisms. The JAVA2 security model provides a policy-based architecture of securing run-time control of code execution based on access permissions assigned to code sources. The J2EE model provides a role-based architecture of securing applications using pre-defined application roles for invoking each method of an Enterprise Java Bean (EJB) or by securing the Uniform Resource Identifier (URI) access of a servlet/Java Server Page (JSP). In both models, roles defined for these applications are driven by the application assembler's or application deployer's view of the enterprise.

Often, roles assigned to a user at the web service method level for one web application may conflict with roles assigned to the user for another application. In a large enterprise, managing users to assume certain roles for a large number of applications can become a tedious task for the system administrator. Thus, most J2EE Product and Tool Providers (e.g., WebSphere) attempt to simplify these tasks by assigning users to groups, and then managing a role-to-group mapping exercise for each application. However, this role-to-group mapping exercise creates another deployment task for the system administrator which can become complicated and hard to manage in a business setting. Thus, the system administrator must be able to delineate each role for each web application and determine how the roles of this application map to the business needs of the enterprise. The system administrator must then determine which user group or groups of the enterprise can assume that role.

A challenge for an administrator is to determine why each user belongs or should belong to a certain group, so that the users obtain the appropriate access to applications, but not to anything more. Group membership for users thus becomes a key element of enforcing security within an enterprise. In addition, each application may need specific information related to the user's profile. These applications may not want to share the identity information of one user from one application to another due to the privacy concerns. Thus, it becomes necessary for the system administrator to ensure that the appropriate set of personally identifying information is consumed by the appropriate set of applications.

Consequently, a system administrator may be required to provision the user profile in a corporate directory with only the requisite data that is absolutely essential for the user's needs. When users are disqualified from using a certain application, the user's profile must be appropriately adjusted to decommission the user from the appropriate set of user groups without affecting other applications. Often, this task is very confusing and conflicting, since application managers cannot keep track of a user's current status within the organization.

A Service Oriented Architecture (SOA) environment typically consists of a loosely-coupled set of applications hosted on multiple distributed platforms, where front-end components of an application portal often interact with back-end legacy applications. These legacy applications may span into different technologies, such as Customer Information Control System (CICS) and Information Management System (IMS). The distributed front-end infrastructure typically is web driven. Users from different communities access the application and invoke web services calls to the back-end legacy systems. The application may make several web services invocations to applications and data sources on diverse systems. The credentials of the authenticated identity validated in the front-end often needs to be propagated all the way to the back-end to establish the correct user credentials for the calls. However, a common problem in the SOA environment is choosing identities for the back-end legacy systems to which the back-end applications need to log on.

In one scenario, a generic pool of identities is used for the back-end legacy systems, and the front-end systems are mapped to these generic identities. However, by doing so, there is no individual user accountability maintained from end-to-end, which can be problematic with regard to auditing purposes. On the other hand, managing individual identities for every identity in the front-end implies managing identities for every identity at the back-end, which is a tedious task. As a result, managing identities, across diverse technology infrastructures, is often a major issue for SOA deployments. The legacy systems have a collection of data repositories like Resource Access Control Facility (RACF) and Access Control Facility (ACF2) which need identity/password management, or at least identities. Thus, each web service for SOA may result in a collection of identities sprinkled across the scope of the trust domain within which the transactions flow.

SUMMARY OF THE INVENTION

The illustrative embodiments provide a computer implemented method, data processing system, and computer program product for logical management and provisioning user access to business applications within the framework of an identity management system. The illustrative embodiments provide an interface layer to map respective attributes, permissions, and resource accounts in a data repository needed to represent access to business applications via a managed service in the identity management system. The illustrative embodiments define user entitlements on a user account associated with the managed service. The illustrative embodiments provision user access to the business applications via the managed service in the identity management system upon user request.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 5B illustrate an example of a service profile for an LDAP service in an identity management system;

FIGS. 6A and 6B illustrate an example of a service profile for a managed application in an identity management system in accordance with the illustrative embodiments;

FIG. 9 is another exemplary screenshot which illustrates how a business use may search and request access in a self-service application in the identity manager in accordance with the illustrative embodiments.

DETAILED DESCRIPTION OF THE PREFERRED EMBODIMENT

Figure 1:
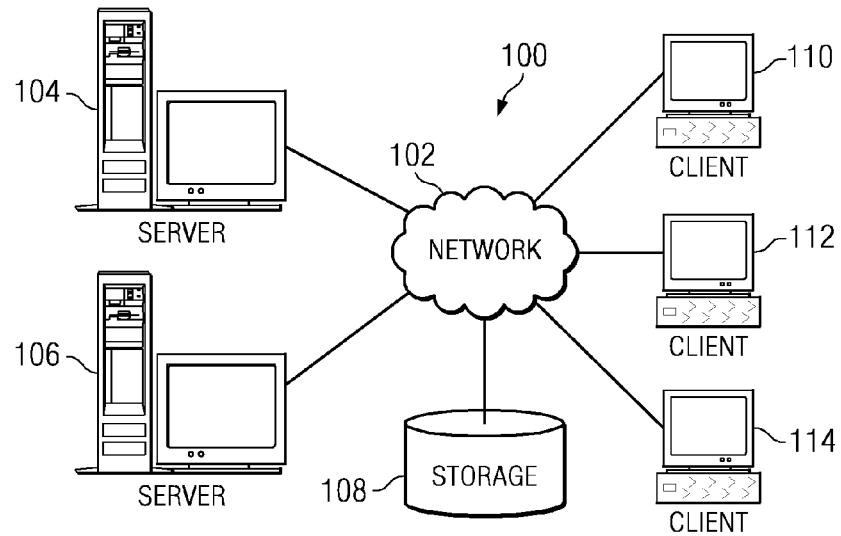
FIG. 1 depicts a pictorial representation of a distributed data processing system in which the illustrative embodiments may be implemented.
Figure 2:
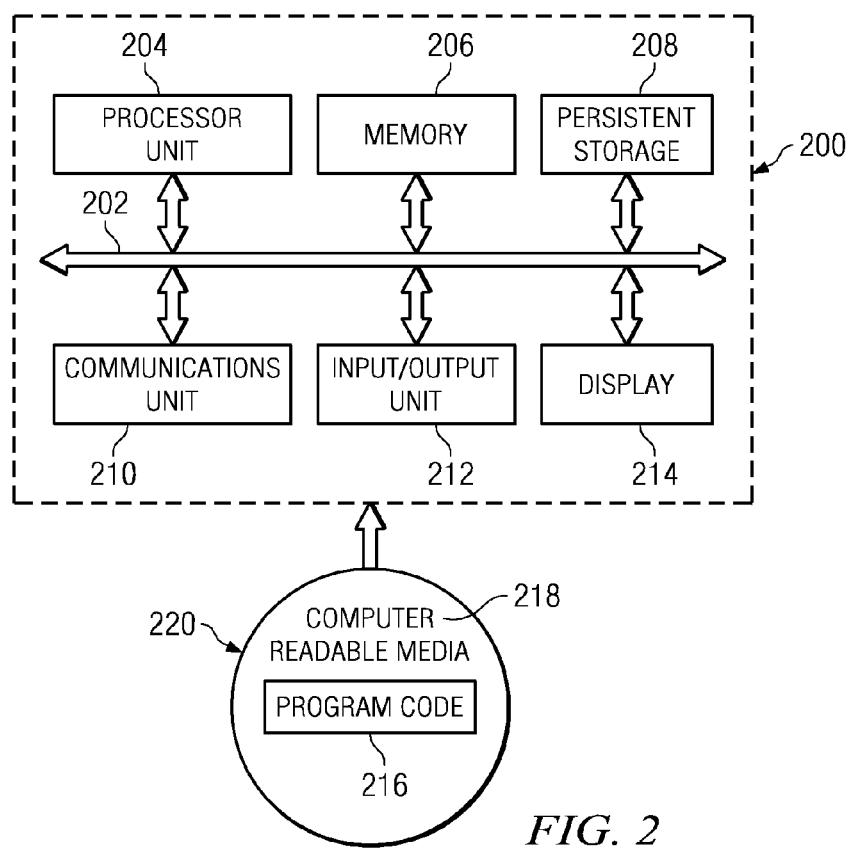
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media x18 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a computer implemented method, data processing system, and computer program product for logical management and provisioning of business applications within the framework of an identity management system. In particular, the illustrative embodiments provide an improvement in existing methodologies and techniques of application access control management. With the illustrative embodiments, business applications may be logically provisioned and managed within the framework of an identity management system similar to managing a user identity on a hardware platform. For example, an identity management system typically manages accounts on UNIX, Windows 2000, or an Active Directory. Existing account provisioning in an identity management system typically creates an account with a user ID (and often a password, etc.) within a repository, such as a Lightweight Directory Access Protocol (LDAP) data repository. This account provides a repository for an identity to be presented to some hardware platform or application. The user is also provided some entitlements within the context of that platform.

Logical provisioning, in contrast, allows an identity management system to manage and provision an application as a service in the identity management system. Logical provisioning places another layer of abstraction on normal platform accounts in a data repository, such as Active Directory or an LDAP repository. This abstraction defines "logical" access entitlements superimposed on this data repository. This abstraction layer hides the complex technical details of the identity management infrastructure from the business user, while allowing the user administrator to manage access entitlements to managed services (IT resources) on the basis of business needs. In this manner, the business aspects in identity management may be decoupled from the IT aspects in order to present access entitlements to business users in a manner that they can understand. Thus, with logical management and provisioning of business applications within an identity management system, access control of applications may be managed by business owners at the higher abstraction layer. Business owners may create applications as managed resources within the context of the identity management subsystem and enforce user attribute level security within an application domain. A managed application is an item that can be owned or accessed by a set of identities, such as a user or an organization group. These managed applications are represented as services in the identity management system. Types of business applications include, but are not limited to, operating systems, J2EE applications, database systems, and web services, etc. Provisioning policies in the identity management system specify which identities are entitled to access the managed applications. Logical provisioning of the managed applications allows the access entitlements to be provided on an "as needed" basis, such as when a user requests access to a managed business application, or upon assignment of the user to a business role (i.e., auto provisioning).

When an application is represented as a service in the identity management system, a user may "subscribe" to the managed application through the identity management system. Thus, a user object may be associated not only with a platform account, but also with a business driven application within the framework of the identity management system. A user may subscribe to a managed application by requesting access to the managed application. If the user has an entitlement to access the application, the user is subsequently associated with the managed application. This subscription manifests itself as an account within the confines of the identity management system, so all role based access control policies that govern ordinary platform accounts also apply to such a managed application.

Logical provisioning of business applications may be particularly useful to business owners who are not part of the typical information technology (IT) organization but who need to control user access and business entitlements for the applications they own. These business owners may prefer a continuous, automated process for granting and revoking applications based on business workflows according to the logical provisioning disclosed in the illustrative embodiments.

Access Entitlement Framework

In one embodiment, the logical provisioning of business applications may be implemented using an access entitlement framework which supports centralized user access entitlement. This access entitlement framework may comprise an access entitlement entity model, a role based access control (RBAC) based model, a lifecycle model, an auditing and reporting model, and an administrative model. The access entitlement entity model is used to abstract the concept of access entitlement to one more aligned with a business perspective. This access entitlement entity model has the flexibility to adapt to different IT infrastructures that support authentication and authorization of the access. The RBAC based model is used to support various security policies around access entitlement. The RBAC based model is built on top of the entity model and provides support for user entitlement provisioning schemes based on enterprise security policies to enable role based provisioning of access entitlements. The lifecycle model is used to support different business processes related to the management of access entitlement. The auditing and reporting model is used to track the lifecycle events related to user access entitlement. The administrative model is used to support delegated administration and access control for access entitlement.

Figure 3:
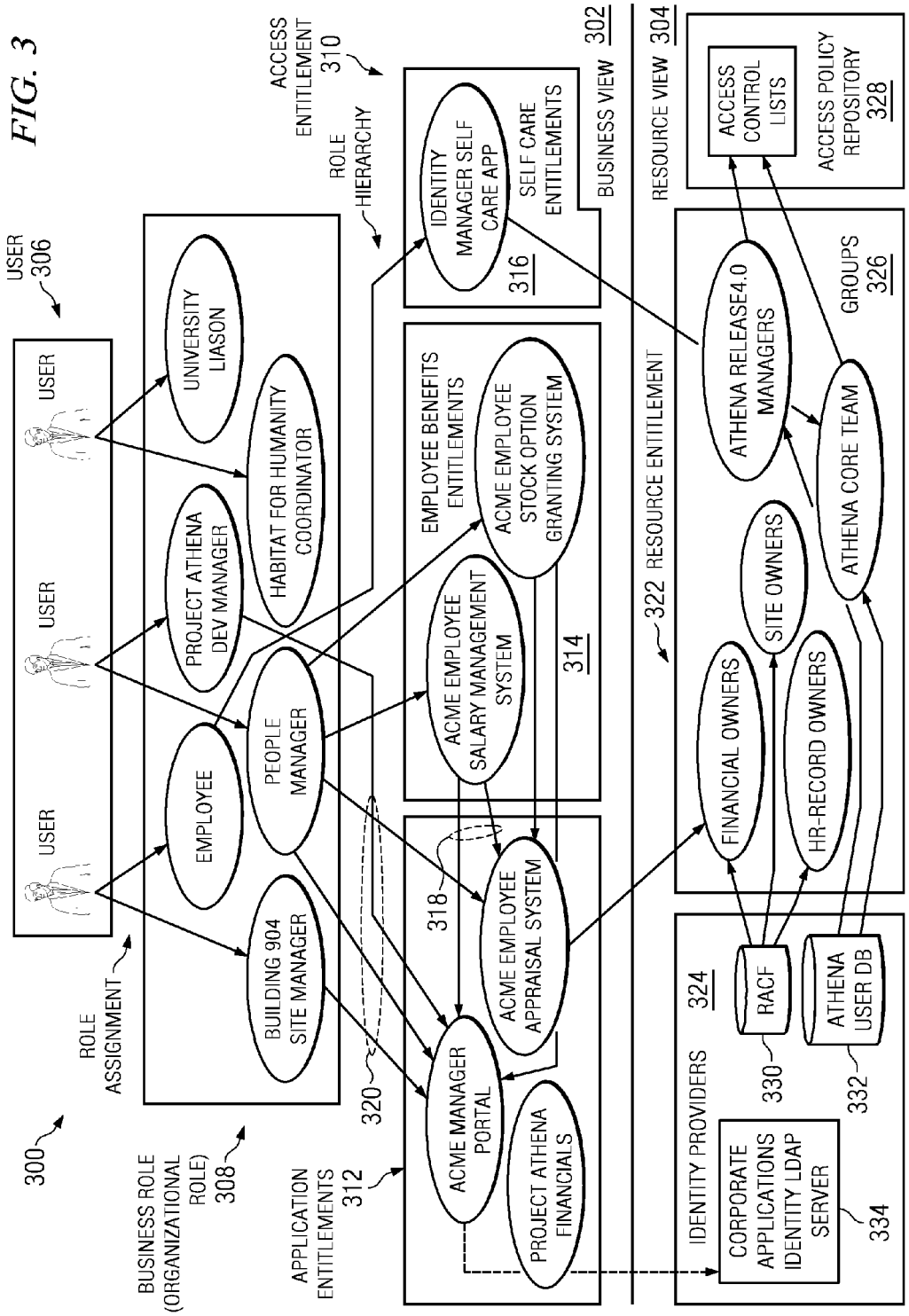
FIG. 3 is a block diagram of an exemplary business model built around an access entitlement framework in accordance with the illustrative embodiments.

FIG. 3 is a block diagram of a business model built around the exemplary access entitlement framework comprising the access entitlement entity model and the RBAC based model in accordance with the illustrative embodiments. The access entitlement framework is provided by an identity management system, such as, for example, Tivoli Identity Manager (TIM). Business model 300 in FIG. 3 may be used to support logical provisioning of business applications within the context of an identity management system. Business model 300 is used to abstract the concept of access entitlement to one more aligned with a business perspective. The abstraction of access entitlement from a business perspective de-couples the implementation details of the IT infrastructure to support access control and allows the same business model to be applied to different IT environments without any impact on the access privileges of the business users.

Business model 300 is shown to comprise a business view 302 and a resource view 304. A business view is the business oriented description of the roles and access privileges so that it can be understood by business users. The roles are defined based on business related job functions for the user. The business oriented description describes the access privileges in the context of a specific business domain, such as what an accountant can do in an accounting application. A resource view describes the details about the underlying access control system that provides a safe-guard to the corresponding business applications. For example, the details may include information about the identity service provider to authenticate the subject user and provide identity and attributes for the user, information about the policy provider in which the access control policy is defined to specify user entitlements and system specific permissions (e.g., access control lists (ACLs)).

In this illustrative example, a company, Acme Inc., employs an identity management system in its business model. Within business view 302, user attributes specific to a organizational role and access entitlement to resources are supported via role assignment, which include assigning a user to one or more business roles in the organization. Organizational roles are used to group people according to their function in the organization. All Acme employees are granted the employee role in the organization. For example, a user 306 may be assigned to one or more organizational roles 308 in a company, such as, for example, site manager, project manager, people manager, etc., as well as ancillary employee roles such as university liaison or habitat for humanity coordinator. Assignment of a user to an organizational role enables role-based provisioning of access entitlements to managed resources. For example, services in an identity manager represent different types of managed resources, such as Oracle databases, Windows machines, etc. An organizational role may be linked to services by means of provisioning policies, entitling persons in the organizational role to an account on the managed resource that is linked to that service.

In addition, one or more access entitlements may be assigned to a user or to an organizational role. Access entitlements 310 specify permissions given to a user or organizational role to access managed resources. Within the access entitlement framework, access entitlement comprises a set of attributes that describes the business perspectives of the access privilege and contains a set of resource entitlements that defines what entitles the user to have the access privilege with a specific resource infrastructure. The set of attributes that describes the access privilege may include the name of the access privilege, the access privilege type (business category), the description of the access privilege, and other access-specific custom attributes from a business perspective.

In this example, access entitlements 310 comprise application entitlements 312, employee benefits entitlements 314, and self care entitlements 316. A user 306 or organizational role 308 may gain access to an application if the access entitlements in application entitlements 312 specify that user 306 or organizational role 308 has access privileges to the application resource. For example, all managers at Acme have access to the Acme manager portal in application entitlements 312. Only people managers may have access to application access entitlements such as the employee salary management system or the employee stock option granting system in employee benefits entitlements 314.

Role hierarchies/dependencies may be built among access entitlements (e.g., lines 318) or organizational role and access entitlement (e.g., lines 320) and be integrated into the organizational role hierarchy. Role hierarchies/dependencies specify a prerequisite for obtaining access to an application. For instance, a user may be granted access to application A only if the user also has access to application B. Thus, the user's access to application A is dependent upon also having access to application B. In this illustrative example, access entitlements to the employee salary management system or the employee stock option granting system are dependent on access entitlements to the employee appraisal system and the manager portal in application entitlements 312 being granted.

Access entitlement types include group entitlement, ad hoc rule entitlement, and composite entitlement. Group entitlement comprises access entitlements fulfilled by organizational role membership in the context of a single identity service provider. Ad hoc rule entitlement comprises access entitlements fulfilled by a Boolean rule defined on set of user attributes in the context of a single identity service provider. Composite entitlement comprises access entitlements fulfilled by multi-resource entitlements in the context of different identity service providers. A multi-resource entitlement comprises access to multiple elements. For instance, a user is granted access to application D. In this example, application D is an aggregated element which comprises applications A, B, and C. Thus, if a user requests access to application D, the user may also obtain access to applications A, B, and C when access to application D is granted.

The managed resources that an identity manager provides provisioning for are represented as services. Within resource view 304, resource entitlements 322 define the conditions in which an access entitlement, such as an entitlement in application entitlements 312, employee benefits entitlements 314, or self care entitlements 316, may be fulfilled for a user with a specific identity provider. Identity providers 324 are authentication authorities which issue and validate user identities and access entitlements for a set of users. The business organization may act as an identity provider for users 306. Identity providers 324 use the conditions in which an access entitlement may be fulfilled to generate a Boolean rule that is used to evaluate if a specific user has the access entitlement, as well as to discover existing user entitlements. The rule may also be used to generate a set of attributes with which the rule provisions the access entitlement for a user. Resource entitlements may be managed in groups, as shown by resource entitlement groups 326. Identity providers 324 may instantiate access entitlement for a user via a set of accounts on related services. An account may contain the user identity, profile attributes, access entitlement attributes (permission attributes), and access specific attributes for the user. An administrative owner can be identified for the access entitlement so that the administrative owner may participate in any lifecycle management process related to the access entitlement, including the access request approval and access recertification process. An existing resource entitlement in the framework may be managed directly as an access entitlement, or it can bind to an abstracted access entitlement object which de-couples any specific dependencies of the framework but contains the static business description of the access privilege.

In this illustrative example, identify providers 324 include Resource Access Control Facility (RACF) 330, Athena user database 332, and corporate LDAP server 334. RACF 330 hosts identities that pertain to any financial management systems (e.g., salary, stock, financial systems). Athena user database 332 hosts identities for applications that pertain to operational systems (e.g., site maintenance applications). Corporate LDAP server 334 hosts identities for people working on the Athena project and is concerned with protecting access to the Athena project.

Modeling of the access entitlement as a manageable entity allows access entitlement to be unified into the RBAC model to support various security policies in access policy repository 328 around access entitlement. An access entitlement may be viewed as a system or application role, and may be associated with business roles. Security policies in access policy repository 328 may be used to define relationships between different organization roles 308, between an organizational role 308 and access entitlements 310, and between different access entitlements 310. Semantics supported in such relationships include inheritance, allow (privileged or granted), relationship constraints, and attribute constraints. An inheritance relationship implies that one role will automatically inherit all privileges of the other role. The privilege inheritance is automatic and enforced consistently. An allow relationship (privileged or granted) implies that membership in one role allows a user to request another role explicitly. The other role may be granted to the user upon the completion of a business workflow. Relationship constraints are a set of constraints that are defined among the different types of roles, including business roles and application roles. For example, the constraints of "separation of duty" may be defined statically or dynamically to prevent a user from having multiple roles according to the RBAC specification. Attribute constraints are a set of constraints which define the user-role assignment restrictions when a role is assigned to user.

Figure 4:
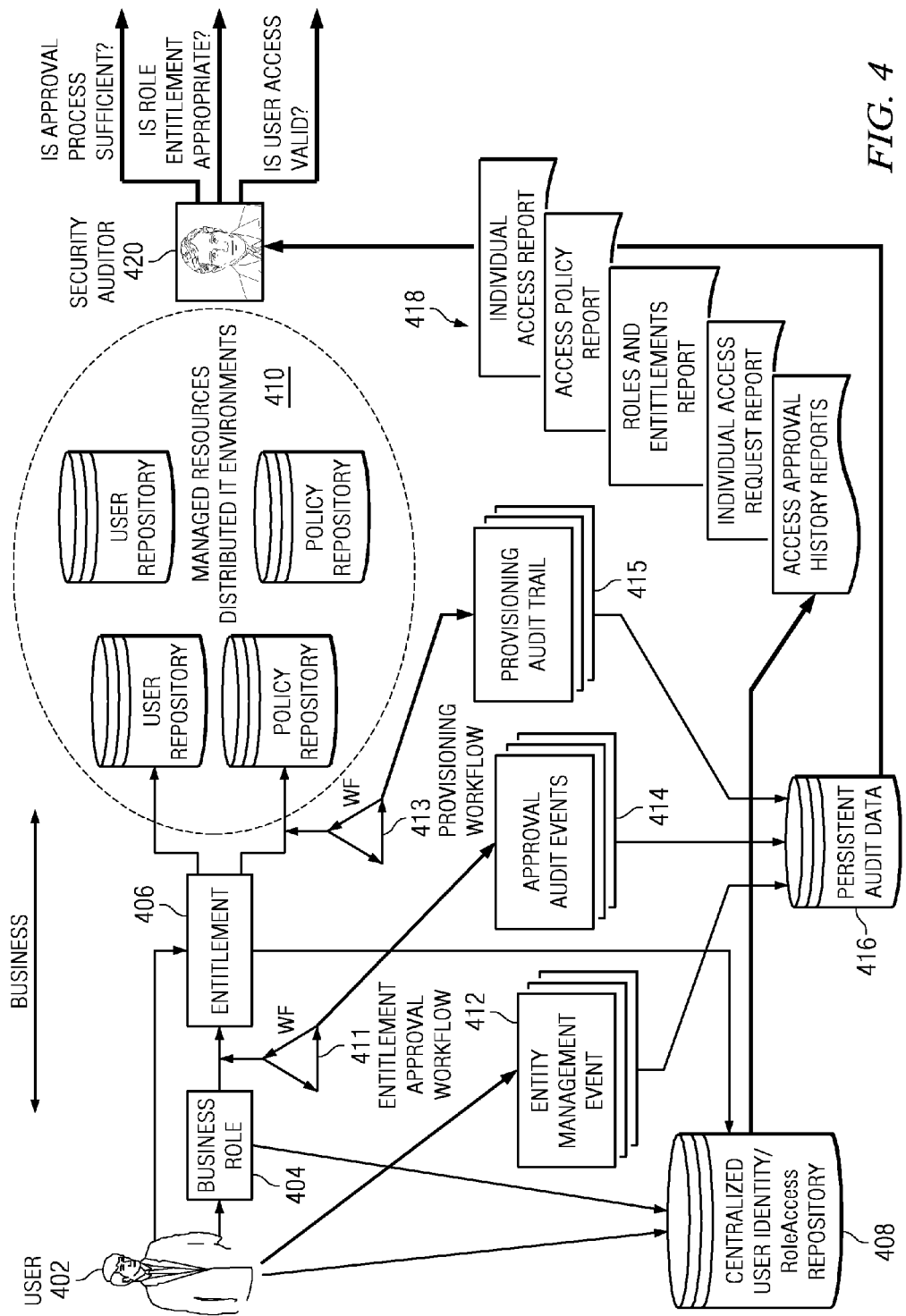
FIG. 4 is a block diagram illustrating auditing and reporting of access management and lifecycle events in accordance with the illustrative embodiments.

FIG. 4 is a block diagram illustrating auditing and reporting of access management and lifecycle events in accordance with the illustrative embodiments. As previously mentioned, the access entitlement framework in which an embodiment of the logical provisioning of business applications in an identity manager may be implemented comprises a lifecycle model to support different business processes related to the management of access entitlement and an auditing and reporting model to track the lifecycle events related to user access entitlement. A lifecycle is a series of stages (or states) traversed by a user access entitlement during its lifetime, from being provisioned (created) to de-provisioned (non-exist). During its lifecycle, user access entitlements can be deactivated or activated, attributes of the user access entitlements can be changed, the user access entitlements may be pending for approval or recertification, the user access entitlements may be marked or cleared for compliance violation, etc. Lifecycle events are triggered either explicitly via lifecycle operations in the identity manager and initiated by users of an identity manager application (e.g., to request an access), or triggered by system configuration changes (e.g., provisioning policy change that triggers auto provisioning of access for a set of users or flagging of non-compliant user access or recertification policy that triggers recertification of user access). In this embodiment, business workflows are defined and associated with different lifecycle events of access entitlement. Generally, a workflow is a series of tasks to define the flow and outcome of a specific operation (action). In this context, the business workflow defines the series of tasks for specific lifecycle operations for user access (such as requestNew (provisioning), approval, recertify, de-provisioning, etc.). Integrating the business workflows with lifecycle events enables access entitlements to be passed in various business workflow operations, such as access requests, access approval, access activation/deactivation, access recertification, and access de-provisioning, among others.

In addition, lifecycle management events associated with access entitlement may be reported to business customers to allow the customers to review and analyze access entitlements. These lifecycle management events are monitored and tracked in the system and used to generate auditing reports to facilitate security regulations and compliance requirements. The auditing and reporting model provides a user interface which allows customers to enter and view access entitlement data.

In this example, information about a user 402, organizational role 404, and access entitlements 406 are maintained in centralized repository 408 where relations between these entities are maintained. User information contains a set of attributes of a user, such as user profile (name, address, job title, and the like). Business role information contains a set of attributes of a business role and constraints of the role and the relationships with other business roles or access entitlements. Access entitlements contain a set of attributes to describe the access privilege and a set of attributes on the user account that grants the access to the user. As shown, a user may be given access entitlements to managed resources 410 in the IT environment directly, or the user may be assigned to an organization role, and the organizational role is given access entitlements to managed resources 410.

Entity management events 412 of user 402 are generated during the execution of lifecycle operations. In some cases, the user is authorized to request a specific access entitlement when the user belongs to a specific business role. In this case, approval is required during access request. Entitlement approval workflow 411 defines the series of approval by designated users. Approval audit events 414 are generated based on role and access entitlement approvals tracked using entitlement approval workflow 411. For instance, when an access approval occurs, approval audit events 414 are recorded, such as the approver, the timestamp, and the outcome of the approval (approved and rejected). Provisioning workflow 413 defines the series of role and access provisioning during the execution of lifecycle operations. When a provisioning event occurs, the provisioning event is recorded in provisioning audit trail 415. These entity management events 412, approval audit events 414, and provisioning audit trail events 415 are stored in audit database 416.

Information in centralized repository 408 and audit trail records in the audit database 416 may be used to generate various reports 418. Security auditor 420 may rely on the reports to validate access against corporate regulations and compliance requirements.

Logical Provisioning of Business Applications

Logical provisioning enables an identity management system to provision an application as a service in the system by placing a layer of abstraction on the platform accounts in a data repository. The abstraction layer defines access entitlements superimposed on the data repository and decouples the business aspects in identity management from the IT infrastructure in order to present access entitlements to business users in a manner that they can understand. This abstraction layer or interface layer maps respective attributes, permissions, and IT resource accounts in the data repository needed to represent access to business applications via a managed service in the identity management system. The layer of abstraction defines user access entitlements on a user account associated with the managed service. User access to the business applications via the managed service is provisioned in the identity management system upon user request.

In one embodiment, the layer of abstraction may be implemented by modifying an existing object in the identity manager—the service profile. Services are used by an identity manager to define the targets (e.g., resources) that are being managed. A service profile (resource definition file) is a configuration file created for each service which defines the key attributes of the managed target. Each service profile has its own characteristics, and can require specific parameters. When a new resource is installed in the IT environment, the new provisioned resource is configured within the identity management server with a service profile. This embodiment modifies the service profile to specify the attributes of the business application. By creating a service profile for the business application and provisioning the application as a service in the identity management system, the business application may be represented as a managed target in the identity management system.

In another embodiment, the layer of abstraction may be implemented using a new object to represent access entitlements from a business perspective. In this embodiment, the new object comprises an access profile. An access profile may be created to define attributes specific to a particular access entitlement. In addition, another object may be used to represent user access entitlements. In this case, a user access entitlement profile may be created to define attributes of user account that are specific to the access (for example, a business application).

FIGS. 5A and 5B illustrate an example of a service profile for an LDAP service in an identity management system. FIGS. 5A and 5B are used to illustrate existing use of the service profile object in an identity management system. In this example, service profile 500 is an XML file which describes the resource definition for an example LDAP service. Service profile 500 includes system profile 502, protocol properties 504, and service definition 506 elements for the LDAP service. System profile 502 describes the behavior of the service. Specifically, system profile 502 specifies the name 508 (e.g., erLDAPservice), description 510 (e.g., LDAP-DSML2 service), and behavior properties 512 (e.g., property name and value to instantiate the protocol module) of the LDAP service.

Protocol properties 504 are used to define protocol parameters (i.e., URLs, IP addresses) common to all instances of the LDAP service. Specifically, protocol parameters 504 specify the LDAP names 514 (e.g., erurl, erUid, and erPassword) of the URL, principle, and credential parameters. Parameters that are specific to each instance are provided in the service schema.

Service definition 506 describes the representation of the provisioned LDAP service. Service definition 506 also identifies the schema classes used to represent the service and a user account on the service. Specifically, service definition 506 specifies the service profile name 516 (LDAPprofile), service class 518 (erLDAPService), attribute name 520 (erServiceName), account class 522 (erLDAPaccount), account profile name 524 (LDAP Account), and description 526 (LDAP DSML2 Service) of the LDAP service.

FIGS. 6A and 6B illustrate an example of a service profile for a managed application in an identity management system in accordance with the illustrative embodiments. FIGS. 6A and 6B are used to illustrate the use of an existing service profile object to implement the abstraction layer for access entitlement in the illustrative embodiments. As previously mentioned, a managed application is an item that can be owned or accessed by a set of identities, such as a user or an organization group. These managed applications are represented as a managed service in the identity manager, rather than as a managed account in the identity manager. To provision a business application as a managed resource in the identity management system, a service profile needs to be created with the appropriate SystemProfile, ProtocolProperties and ServiceDefinition values for the nested elements. The service profile created for the managed application should encompass the high level abstraction of an application. This high level abstraction is placed on top of normal platform accounts in a data repository, such as an LDAP repository. The abstraction defines the logical access entitlements superimposed on the data repository.

In this example, the managed application is a web based sales application, SalesForecasting. This example SalesForecasting application allows users to gain access to sales forecasts in several regions, for several products, etc. To manifest such a web based sales application within the identity manager, an equivalent service profile (resource.def) file 600 is created for the application. By creating a service profile for the business application and provisioning the application as a service in the identity management system, the business application may be represented as a managed target in the identity management system.

In this example, service profile 600 is an XML file which describes the resource definition for an example SalesForecasting web service application. Service profile 600 includes system profile 602, protocol properties 604, and service definition 606 elements for the application service. System profile 602 describes the behavior of the application service. Specifically, system profile 602 specifies the name 608 (e.g., erSalesForecastService), description 610 (e.g., Sales Forecasting Service), and behavior properties 612 (e.g., property name and value to instantiate the protocol module) of the sales forecasting service.

Protocol properties 604 are used to define protocol parameters (i.e., URLs, IP addresses) common to all instances of the sales forecasting service. Specifically, protocol properties 604 specify the LDAP names 614 (e.g., erurl, erUid, and erPassword) of the URL, principle, and credential parameters.

Service definition 606 describes the representation of the provisioned sales forecasting service. Service definition 606 also identifies the schema classes used to represent the service and a user account on the service. Specifically, service definition 606 specifies the service profile name 616 (SalesForecastProfile), service class 618 (erSalesForecastService), attribute name 620 (erServiceName), account class 622 (erSalesForecastAccount), account profile name 624 (Sales Forecasting Account), and description 626 (Sales Forecasting DSML2 Service) of the sales forecasting application service.

The attributes of the application service may also be pre-filled during the configuration steps of defining a provisioning policy. This configuration allows a large number of users within a certain organization role to gain access to the same specific service attribute (e.g., territory or a specific product). Thus, the identity manager may govern the attribute of a business application object (e.g., territory, etc.) from within the confines of its own provisioning policy.

Figure 7A:
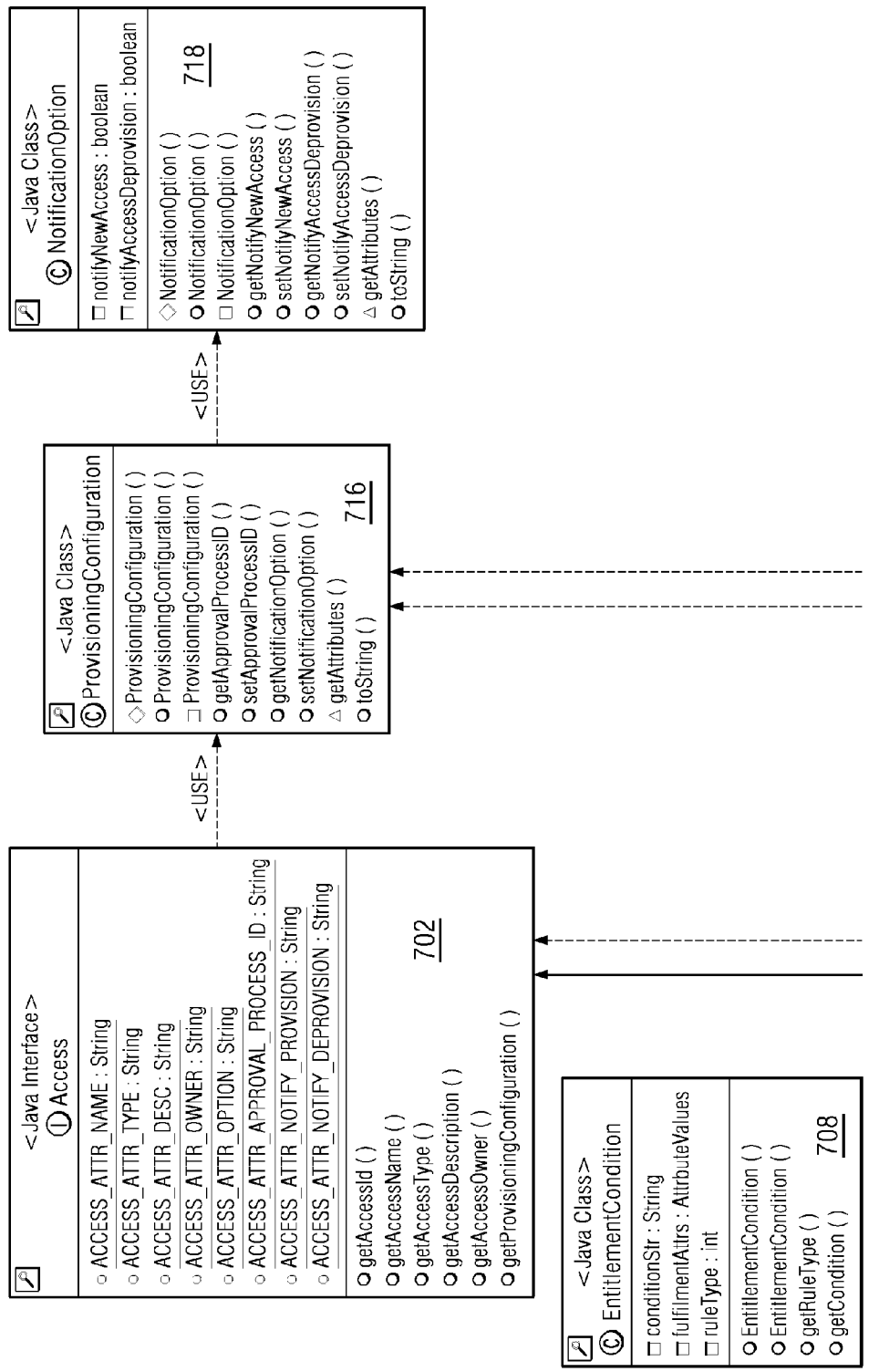
FIGS. 7A and 7B illustrate a class diagram for access entitlements in accordance with the illustrative embodiments.
Figure 7B:
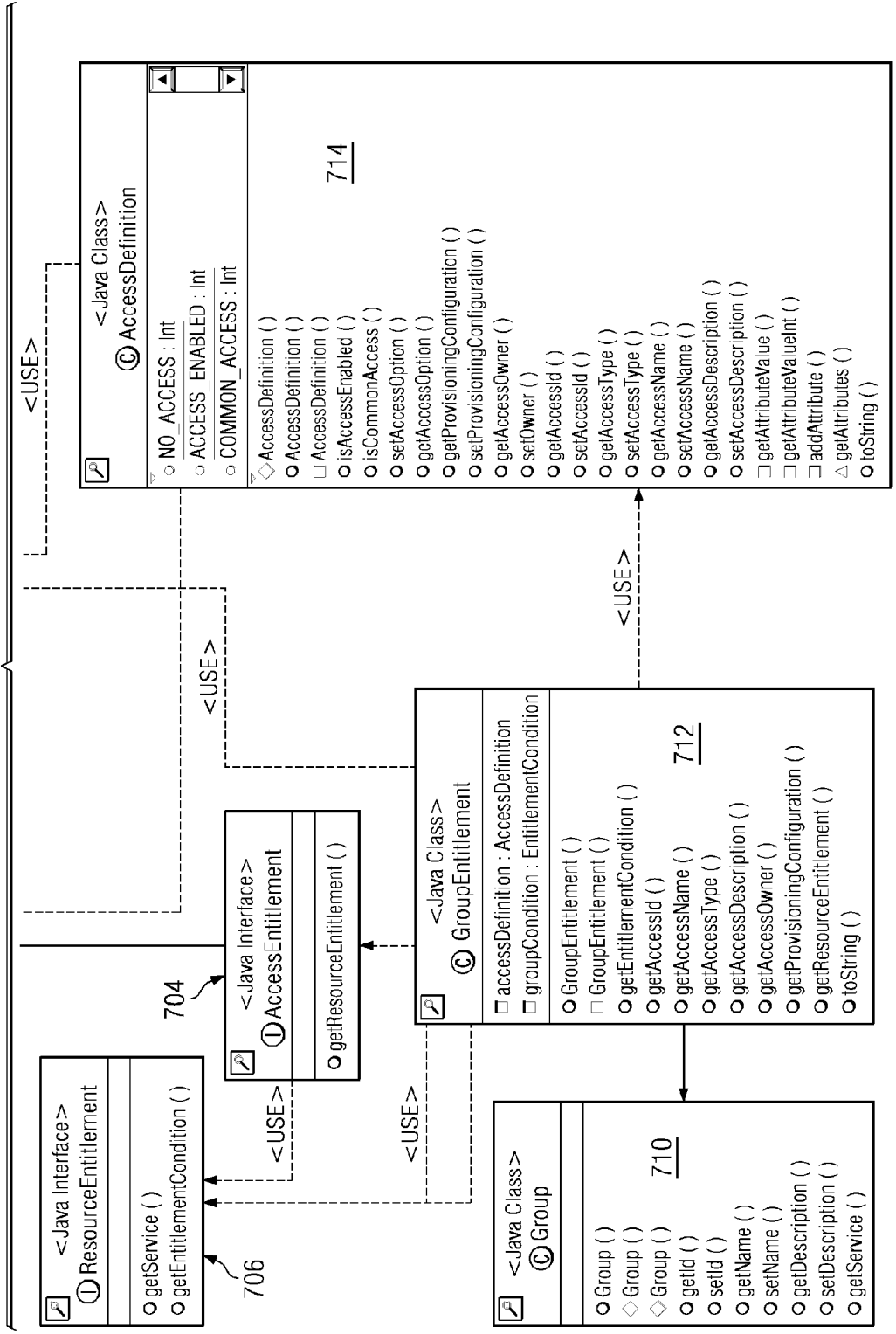

FIGS. 7A and 7B illustrate a class diagram for access entitlements in accordance with the illustrative embodiments. FIGS. 7A and 7B are used to illustrate an implementation of the abstraction layer for access entitlement using the new access profile object in the identity management system. The access profile is created to define attributes specific to a particular access entitlement.

Access 702 class abstracts the access entitlements to IT resources from a business aspect regardless of how the access privilege is fulfilled in a specific deployment. Access 702 contains configuration-related user access provisioning, such as, for example, access owner, which identifies the owner for the access and which is typically used for access configuration and access approval purposes, provisioning configuration, which defines the provisioning scheme for the entitlement provisioning, approval definition, which defines the approvals required for an entitlement provisioning request, and notification options, which specifies the configuration for different types of notification related to access entitlement (e.g., notification when an entitlement is provisioned to a user; or when an entitlement is de-provisioned from a user).

AccessEntitlement 704 class extends access 702 class interface by providing information about how the access privilege can be fulfilled in a specific deployment which is described by a set of resource entitlements. Users request access on the abstracted access entitlement instead on the resource specific entitlement. The de-coupling of the business and IT aspects of the access entitlement hides the complexity of the IT infrastructure and enables business users to manage user access in a business friendly manner.

ResourceEntitlement 706 class represents a resource specific entitlement. ResourceEntitlement 706 contains information about the identity service and the entitlement conditions to fulfill the access privilege. ResourceEntitlement 706 is not a manageable entity but managed by the identity manager via access entitlement.

EntitlementCondition 708 class defines the condition to fulfill access privilege. The interface returns a rule specified on an account of the identity store to check if the account is being fulfilled with the access privilege. The interface also returns a set of account attributes which can be used to fulfill the account with the access privilege.

Group 710 class represents a group on a managed service. A group defines a set of users so that they can be administered collectively for access control purposes.

GroupEntitlement 712 class is the implementation of AccessEntitlement 704 class in which access is controlled by a group.

AccessDefinition 714 class is the value object that implements access 702 class interface and provides access information.

ProvisioningConfiguration 716 class contains information about access provisioning configurations, including the access approval and notification configurations.

NotificationOption 718 class specifies the notification options for various access entitlement related event. Notification is available when an access entitlement is provisioned for a user (either requested by user or automatically provisioned) or when an access entitlement is de-provisioned from a user.

Figure 8:
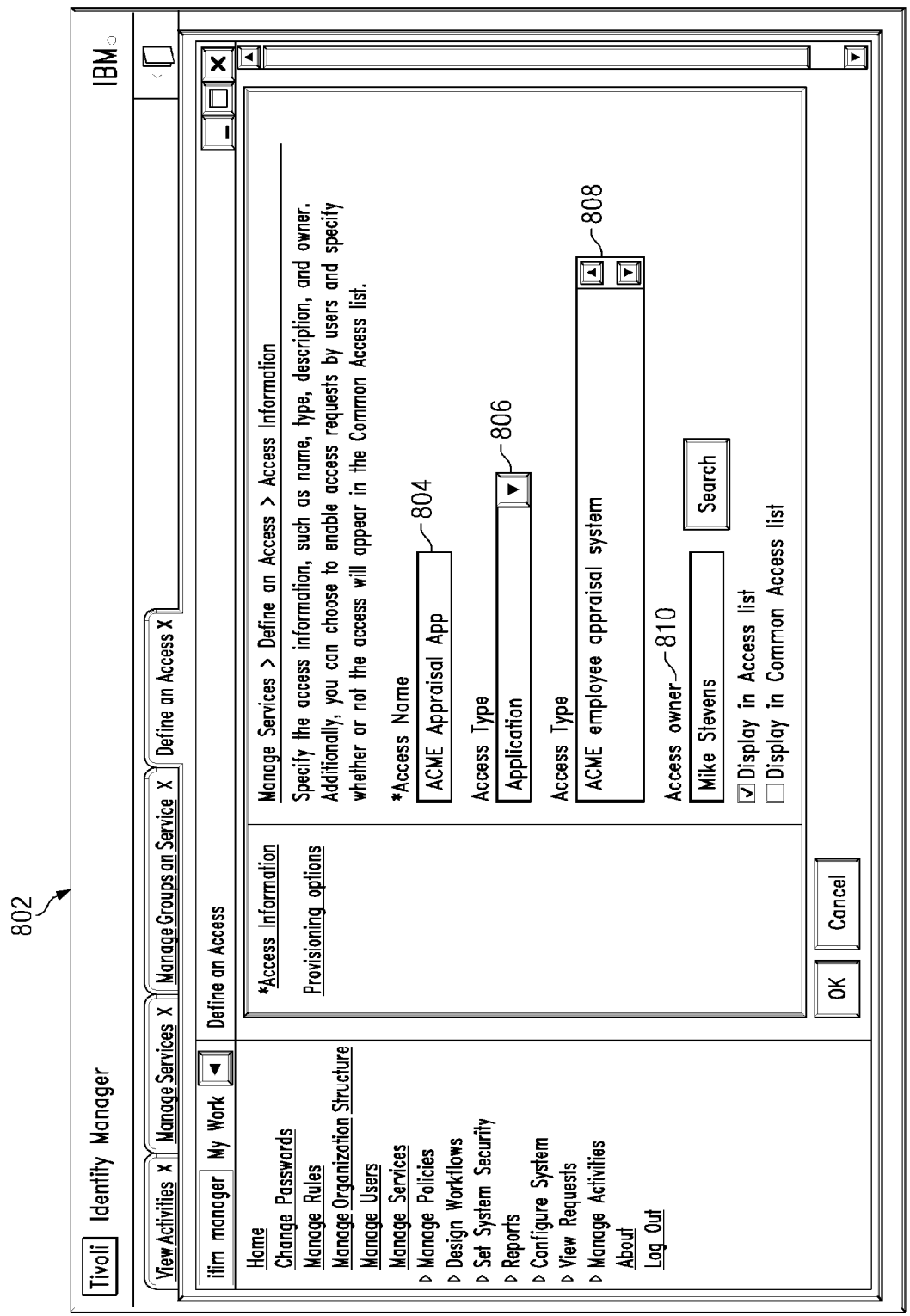
FIG. 8 is an exemplary screenshot which illustrates how access is defined for a group in an RACF Identity Server in an administrator console application of the identity manager in accordance with the illustrative embodiments.

FIG. 8 is an exemplary screenshot which illustrates how access is defined for a group in an RACF Identity Server in an administrator console application of the identity manager in accordance with the illustrative embodiments. In particular, FIG. 8 illustrates how an IT administrator may configure an access entitlement service. In this example, Acme appraisal application is a business application provisioned as a managed service in the services list of the identity manager. Acme appraisal application is the ServiceProfileName for the managed application service. Within user interface 802, an IT administrator may specify the name 804, the access type 806, and the description 808 of the managed service, as well as the access owner 810.

FIG. 9 is another exemplary screenshot which illustrates how a business use may search and request access in a self-service application in the identity manager in accordance with the illustrative embodiments. User interface 902 is presented to the business user in which the user can easily search for and select applications, shared folders, etc. using the layer of abstraction for access entitlements.

Figure 10:
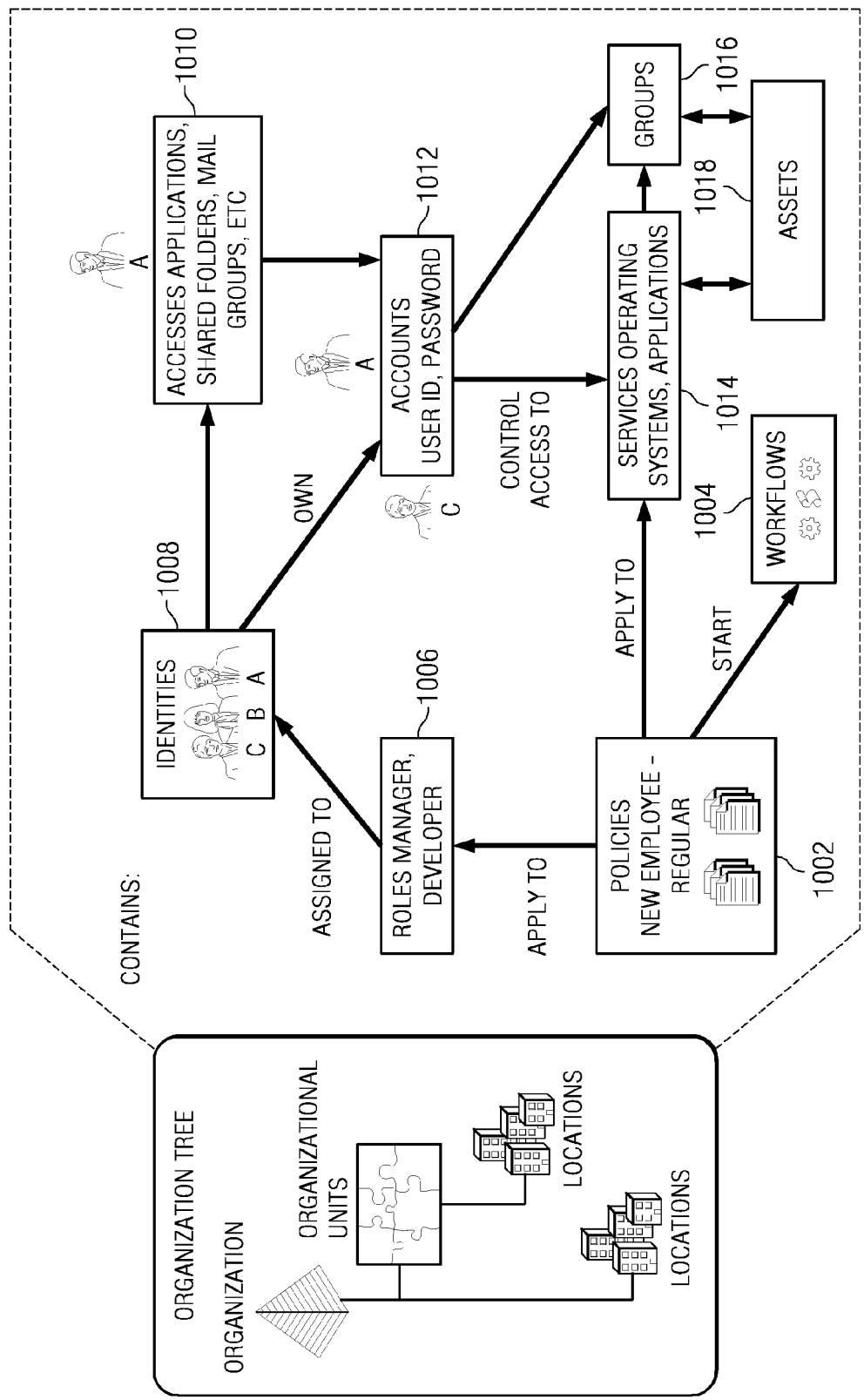
FIG. 10 is a flowchart of a process for logically managing and provisioning business applications within the framework of an identity management system in accordance with the illustrative embodiments.

FIG. 10 illustrates a process for logically managing and provisioning business applications within the framework of an identity management system in accordance with the illustrative embodiments. The process described in FIG. 10 may be implemented in an access entitlement framework 300 in FIG. 3. The process described in FIG. 10 may also be implemented using either existing objects within the identity management system as described in FIGS. 5A, 5B, 6A and 6B or new objects within the identity management system as described in FIGS. 7A and 7B to provide the layer of abstraction for access entitlement.

The process begins by defining policies 1002 for access entitlement in a business organization. These policies may be set using access entitlement business workflows 1004 in the organization. The policies are then applied to various business roles 1006 defined in the organization.

Next, the business roles are assigned to various identities 1008, or users, in the organization. Access entitlements 1010 may be assigned to each identity. These access entitlements may specify an identity's access to applications, shared folders, mail groups, and the like.

Accounts 1012 may also be created for an identity. The account may contain a user ID and password for the particular identity. These accounts are then used to control access to managed services 1014 in the identity management system, such as operating systems and business applications. These accounts may also be used to control access to service groups 1016. The services and service groups are used to access IT assets 1018.

The concept of representing a business application as a managed target in an identity manager may also be extended to include the provisioning of a web service as a managed target. In a SOA/WebServices environment, an application's implementation details are exposed to the system administrator. The illustrative embodiments allow for identity provisioning to an abstraction of a composite application or a higher level business service to insulate the administrator from the application details. Logical provisioning in the identity manager maps the web service interface (or business service definition) down to the actual physical endpoint. The identity manager may contain provisioning policies to the web service (e.g., Sales Forecasting service). The identity manager may pull the meta-data description of the web service for the associated set of endpoints for this composite service, from a CMDB or a Web Services registry.

Thus, identity provisioning may supplement the run-time propagation of web services related identities, provisioning the identity simultaneously to a Windows registry (for desktop SSO), an LDAP server (J2EE app), and a back-end RACF identity store (e.g., for a CICS transaction server). With the illustrative embodiments, identities required for a web service configured in an identity manager may be provisioned without the user having to know the data store in which this identity is manifested. Thus, an identity manager may manage identities for applications and web services, not just resources such as UNIX or RACF.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The invention can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for provisioning user access to a business application within a framework of an identity management system, the computer implemented method comprising:
generating a service profile for the business application comprising information used to access the business application to form a managed service in the identity management system;
defining entitlements for the managed service comprising a set of conditions for accessing the managed service and permissions to be assigned to a user when the set of conditions is met;
responsive to receiving a request to access the business application from the user, determining whether the set of conditions for accessing the managed service is met by the user; and
responsive to a determination that the set of conditions for accessing the managed service is met by the user, provisioning the user access to the business application such that the user accesses the managed service using the information in the service profile.

2. The computer implemented method of claim 1, wherein types of business applications include operating systems, J2EE applications, database systems, and web services.

3. The computer implemented method of claim 1, wherein the step of determining whether the set of conditions for accessing the managed service is met by the user comprises determining whether the user is in an organizational role that satisfies the set of conditions.

4. The computer implemented method of claim 1, wherein the user is in a first organizational role, and wherein the set of conditions comprises a relationship constraint in which a condition in the set of conditions is satisfied when the first organizational role of the user is associated with a second organizational role in the identity management system and the set of conditions is satisfied when the user is in the second organizational role.

5. The computer implemented method of claim 1, wherein the entitlements are managed on a lifecycle basis for the user.

6. The computer implemented method of claim 5, wherein a provisioning workflow is used to track lifecycle events for the lifecycle basis.

7. The computer implemented method of claim 6, wherein the lifecycle events include access requests, access approval, access activation, access deactivation, access recertification, and access de-provisioning.

8. The computer implemented method of claim 1, wherein the identity management system comprises audit and reporting functions for auditing the user access entitlements to the managed service.

9. The computer implemented method of claim 1, wherein the request to access the business application comprises an identifier for the managed service in a user interface, wherein the user interface presents a plurality of managed services for which the user may request access.

10. The computer implemented method of claim 1, wherein the user is in a first organizational role, the first organizational role inherits privileges from a second organizational role in a hierarchy of organizational roles in the identity management system, and wherein a condition in the set of conditions is satisfied for the user when the condition is satisfied by the second organizational role.

11. The computer implemented method of claim 1, wherein the business application comprises a web service.

12. The computer implemented method of claim 1, wherein defining the entitlements is performed upon receiving a request from the user to access the managed service.

13. The computer implemented method of claim 1, wherein defining the entitlements is performed upon assignment to a business role.

14. The computer implemented method of claim 1, wherein the information comprises system profile values, protocol property values, and service definition values, and wherein the step of provisioning the user access to the business application such that the user accesses the managed service using the information in the service profile comprises:
    generating a user account in the identity management system for the user such that the user accesses the managed service using the user account and the information in the service profile.

15. The computer implemented method of claim 1, wherein defining the entitlements is managed by business policies set with access entitlement business workflows.

16. A data processing system for provisioning user access to a business application within a framework of an identity management system, the data processing system comprising:
    a bus;
    a storage device connected to the bus, wherein the storage device contains computer usable code;
    at least one managed device connected to the bus;
    a communications unit connected to the bus; and
    a processing unit connected to the bus, wherein the processing unit executes the computer usable code to generate a service profile for the business application comprising information used to access the business application to form a managed service in the identity management system; define entitlements for the managed service comprising a set of conditions for accessing the managed service and permissions to be assigned to a user when the set of conditions is met; determine whether the set of conditions for accessing the managed service is met by the user responsive to receiving a request to access the business application from the user; and provision the user access to the business application such that the user accesses the managed service using the information in the service profile responsive to a determination that the set of conditions for accessing the managed service is met by the user.

17. A computer program product for provisioning user access to a business application within a framework of an identity management system, the computer program product comprising:
    a non-transitory computer readable storage medium having computer readable program code tangibly embodied thereon, the computer readable program code comprising:
    computer readable program code for generating a service profile for the business application comprising information used to access the business application to form a managed service in the identity management system;
    computer readable program code for defining entitlements for the managed service comprising a set of conditions for accessing the managed service and permissions to be assigned to a user when the set of conditions is met;
    computer readable program code for, responsive to receiving a request to access the business application from the user, determining whether the set of conditions for accessing the managed service is met by the user; and
    computer readable program code for, responsive to a determination that the set of conditions for accessing the managed service is met by the user, provisioning the user access to the business application such that the user accesses the managed service using the information in the service profile.

18. The computer program product of claim 17 wherein the computer readable program code is stored in a non-transitory computer readable storage medium in a data processing system, and wherein the computer readable program code is downloaded over a network from a remote data processing system.

* * * * *